Figures 1, 2:
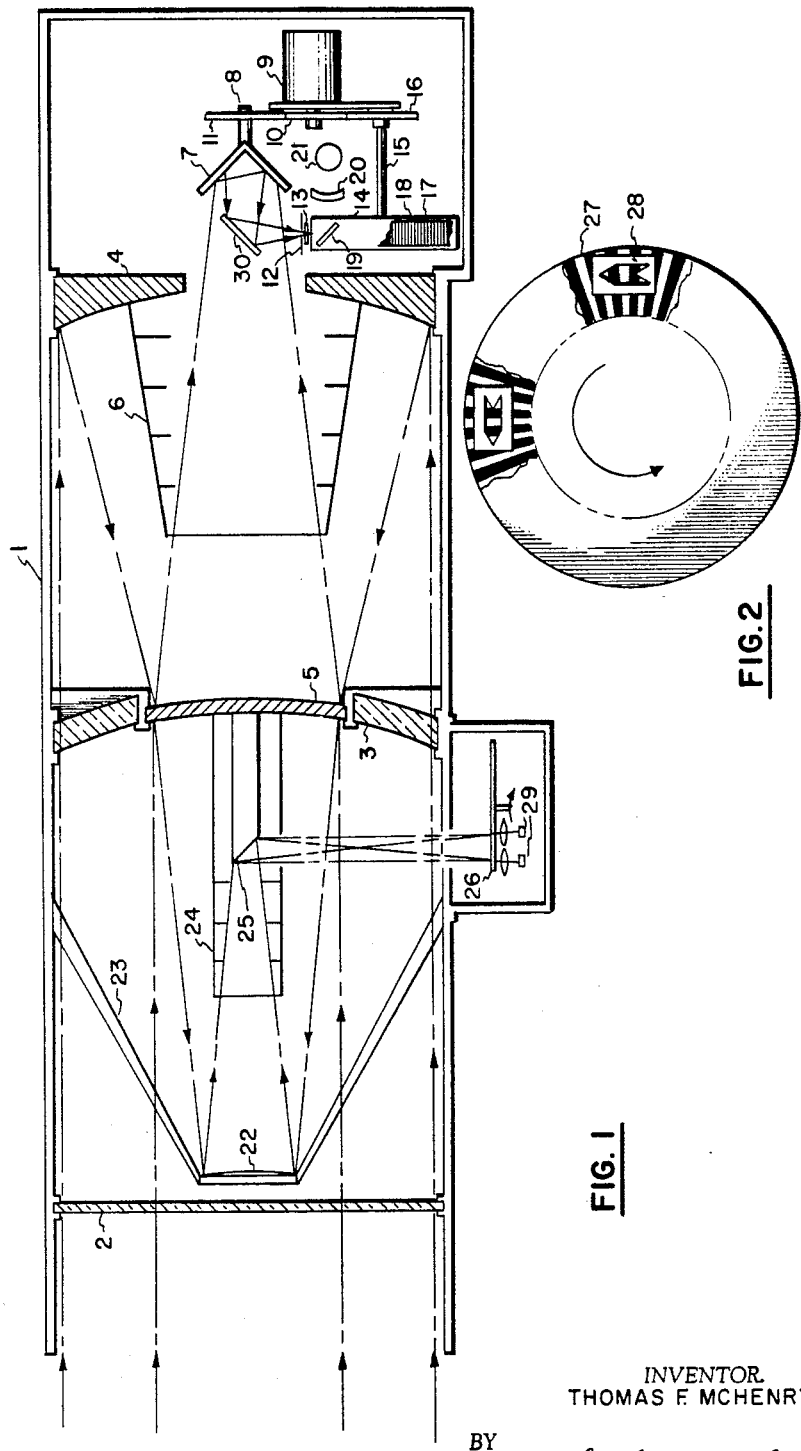

April 5, 1966     T. F. McHENRY     3,244,885

HIGH RESOLUTION FREQUENCY MODULATED TRACKER

Filed March 9, 1962

INVENTOR.
THOMAS F. MCHENRY

BY

*ATTORNEY*

United States Patent Office
3,244,885
Patented Apr. 5, 1966

3,244,885
HIGH RESOLUTION FREQUENCY MODULATED TRACKER
Thomas F. McHenry, East Norwalk, Conn., assignor to Barnes Engineering Company, Stamford Conn., a corporation of Delaware
Filed Mar. 9, 1962, Ser. No. 178,664
3 Claims. (Cl. 250—203)

This invention relates to an improved tracker and particularly to a compact tracker in which there are provided wide field acquisition and narrow field tracking.

When dealing with very small targets moving rapidly it is often desirable to provide high accuracy in a tracker. At the same time the tracker should be compact. This latter requirement is usually met by folding optics, for example, a Cassegrain system. High accuracy has been obtainable by rotating the beam from the collecting optics producing a rotating image of an off center target on a rotating drum reticle provided with radiation interrupting bars. When the target is exactly centered the frequency of interruption is unmodulated but when the target is off center its frequency is modulated by the rotating image. The deviation from the interruption frequency represents the magnitude of displacement of the target from center and phase relationships providing information with respect to the direction in which the target is located. Such a device gives high tracking accuracy but utilizes a Dove prism or similar mechanism for rotating the beam. This is described in the copending application of Jankowitz, U.S. Patent No. 3,061,730, October 30, 1962. A Dove prism is usable only with a slow optical system of low beam convergence. This results in instruments of great length. The prism cannot be used in a compact folded system because its length is greater than the space available.

The first aspect of the present invention which is applicable even when there is only a single field of view lies in the use of a retroflector instead of a Dove prism or its mirror analog. Essentially the retroflector consists of two reflecting surfaces at right angles to each other, which may be a right angle mirror where the reflection is from mirror surfaces or a retroflecting prism in which the reflections are from the interfaces of the material of higher refractive index and air or other lower refractive index material. In either case the element is very short, under favorable circumstances a minute fraction of the length of a Dove prism. When the retroflector is rotated about an axis through and at right angles to the intersection of the edges of the retroflector the beam of incident light is reflected and is rotated. A suitable plane mirror then permits turning the rotating beam at an angle or the detecting mechanism may be within the beam between the retroflector and the entrance aperture of the collecting optics. The former is much preferable as a small mirror suitably located can be used with a minimum of obscuration.

The second aspect involved in the present invention deals with multiple field instruments, for example, wide field and narrow field tracking optics. In this modification the wide field may constitute a Cassegrain system with or without spherical correction. The secondary mirror of the Cassegrain is then developed as a double mirror, convex on one side to act as the Cassegrain secondary and concave at the other side to act as a collecting mirror for the fine field optics. This modification presents two operating advantages. The first is that the single element performs two functions and the second is that there is little or no loss of energy because the secondary mirror of the wide field Cassegrain obscures the incoming energy and this energy is lost in any event but by means of the second aspect of the present invention the obscured zone can be used as fine field collecting optics.

It should be emphasized that while both features of the present invention may be combined in a single tracker they can be used separately. Whether to use the second aspect of the invention with a mirror which performs a dual function or to use separate optics is largely a practical compromise. Where maximum compactness and lightness are the most important factors the combination of both features of the invention presents many advantages. On the other hand where this extreme compactness and lightness is not essential a separate mirror for the fine field is advantageous for the reason that precise focusing adjustments are more easily made when the mirrors are separate and also that a double mirror with a high degree of precision on both its concave and convex sides represents a considerably more expensive optical element. As both sides of the blank have to be very precisely formed it adds to the cost but it permits changes in focus in use with small shifting of components. Where the prime consideration is weight and compactness both features of the invention will be used and where this is not of importance the two organizations of collecting optics will be kept separate. This versatility is an important practical advantage of the invention. Because it is not necessary to use the second aspect of the present invention the two aspects may be considered as quite independent and distinct even though they may be incorporated into a unitary instrument.

The present invention deals with an optical instrument and essentially the instrument is not concerned with the nature of the radiation it receives. Thus it may be used with ultraviolet or visible radiations but considering the predominantly catoptric features of the resulting instruments, the advantages of the present invention are more marked with instruments operating in the infrared and such instruments may be considered as constituting the single most important field of utility. However, the operation of the invention is not changed in the slightest when infrared radiation is used except insofar, as is obvious, that radiation detectors suitable for the wave-length of the radiation used must be employed. Because of the great utility in the infrared field the invention will be described in greater detail in conjunction with an infrared instrument which, however, should be understood to be only a typical embodiment.

The invention will be described in greater detail in conjunction with the drawings in which:

FIG. 1 is a section, partly broken away, with optical paths in diagrammatic form, and FIG. 2 is a plan view of a narrow field reticle and mask with parts of the mask broken away.

The instrument of FIG. 1 includes a housing 1 which may be made readily aimable for use in a tracker and may be provided with a window 2 of suitable material for the radiation used. The wide field portion of the instrument will first be described. Incoming radiation as shown by the arrows passes through a refracting corrector plate 3 striking a Cassegrain primary mirror 4. From this mirror the radiation is reflected onto a secondary mirror 5 the convex surface of which reflects the radiation back through the opening in the Cassegrain primary. Light baffling to prevent stray radiations is provided at 6.

The beam from the secondary mirror 5, which is converging, strikes a retroflector 7 which is illustrated as two right angled mirrors. Of course, a prism may be used instead. The retroflector is rotated on an axis 8 by means of a motor 9 operating through suitable gearing 10 and 11. The rotation of the retroflector results in rotating the beam at twice the rotation rate. A plane mirror 30, located in a narrow part of the rotating beam, directs it at right angles where it passes through a suitable aperture stop 12 and filter 13 onto a rotating drum reticle 14. This reticle is driven by its shaft 15 from the same motor 9 through an additional gear 16 so that it rotates in synchronism with but not necessary at the same rate as the retroflector 7.

The drum 14 is provided with a series of transparent and opaque bars shown at 17 and 18 respectively. The bars are shown with greatly exaggerated widths to make the drawing clearer. In actual instruments the bars are quite narrow, for example, there may be 500 pairs of opaque and transparent bars per inch of reticle. Inside the drum reticle is a plane mirror 19 which directs radiation through a field lens 20 onto an infrared detector 21. As the detector may be conventional in design it is shown purely diagrammatically.

The output of the detector is chopped at a predetermined frequency by the bars 17 and 18 and is introduced into processing electronics which are not shown as they are the same as used in a high resolution tracker employing a Dove prism. The electronic circuits, of course, include a frequency modulation detector and phase sensitive circuits.

If a target is on the optical axis of the system it will be imaged on the drum reticle at a stationary point and the only output from the detector 21 will be the primary chopping frequency. In the frequency modulation detecting circuits this produces no output. If the body is not on the optic axis its image will describe a circle on the drum reticle the radius of which is a measure of the departure of the target from the optical axis. This is detected as a deviation of the chopping frequency and produces an output at twice the frequency of rotation of the retroflector 7. The phase of this output gives information with respect to the departure from the optic axis of the target along two orthogonal axes. If the instrument is part of a tracker the final detected output of the frequency modulated signal can actuate suitable servo mechanisms for aiming the tracker to return the target to its centered position. The operation is the same as that described in the above referred to Jankowitz patent.

The wide field portion of the instrument which has just been described is extremely effective and quite accurate but any tracking is not precise unless a comparatively small field can be used. In a combined instrument shown in the drawings this narrow field strikes the concave side of mirror 5 which constitutes the primary mirror of the fine field system. Incoming radiation is reflected to a secondary mirror 22 which is supported on thin arms 23 providing a minimum of obscuration for either fine or coarse field radiation. The beam from this mirror, also suitably shielded from scattered light by an optical baffle 24, strikes a plane mirror 25 and comes to a focus on a reticle 26 behind which are located two detectors 29. The reticle is of the design shown in FIG. 2. This reticle is provided with bars 27 and aperture masks 28, 90° apart, behind each mask is one of the detectors 29. Each detector gives information in the form of phase relations of departure of the target from the optic axis in each of two orthogonal directions. The mask shape eliminates chopping of a uniform background utilizing segmented edges which are described and claimed in the Merlen Patent No. 3,169,164, February 9, 1965. The reticle and mask combination is the same as the fine field masks described in the patent to Astheimer and Merlen, Patent No. 2,961,545 issued November 22, 1960. The electronic processing circuits for the two detectors are the same as in the patent and are, therefore, not shown. The fine field reticle and detectors are not changed by the present invention which may be said to cease when the target images are produced. The novelty of this portion of the invention lies in the double use of the mirror 5 which eliminates an element in the combination without eliminating its function and which obtains optimum results without loss of energy because the use of the convex side of mirror 5 does not reduce the energy available for the wide field portion of the instrument as it is located only in the area which is obscured anyway by the mirror 5 the convex surface of which constitutes the secondary mirror of the wide field Cassegrain system. Thus, a combined operation with fewer elements is obtained without any loss of efficiency.

When the present invention is incorporated in a tracker as is illustrated in the drawings it is customary first to acquire the target on the wide angled field either by manual aiming or other conventional means. When it is centered in the wide angle field within the precision made possible by the elements thereof tracking is switched to the output of the fine field detectors. This can be done manually or automatically in the electronic processing circuits as illustrated in the Astheimer and Merlen patent referred to above. It will be seen that the extreme compactness maximum resolution and energy utilization of the phase of the present invention are suitable for incorporation into a proven standard form of tracker, without any modification except insofar as the coarse field processing circuits should be of the type described in the Jankowitz patent instead of the coarse field processing circuits described in the Merlen and Astheimer patent. Both types of circuits constitute straightforward electronics and it is an advantage that the improved optical elements of the present invention can be used with standard circuits and other elements and do not require special circuits or operating devices when used in a tracker.

I claim:

1. A tracker comprising in combination and in optical alignment,
   - (a) a moving drum shaped reticle provided with uniform radiation interrupting pattern on the drum periphery and a radiation detector,
   - (b) collecting and imaging optics producing a converging beam to image the field of view of the instrument in the plane of the reticle,
   - (c) means for rotating the image about an axis at right angles to the movement of the reticle beam pattern and to the reticle plane, said means comprising a pair of reflecting surfaces including a right angle, the angle being centered on the axis of the converging beam from the collecting optics whereby said beam is retroflected from the pair of reflecting surfaces back along the axis of the beam and means for rotating said reflecting surfaces about the beam axis at a frequency lower than the radiation interruption frequency from the pattern on the reticle, whereby a frequency modulated signal is produced from the radiation detector,
   - (d) means for amplifying and demodulating the signal from the radiation detector to produce an amplitude modulated output proportional to frequency modulation,
   - (e) phase reference generating means at 90° out of phase with the rotation of the image, means for actuating the reference signal generating means in synchronism with beam rotation, and
   - (f) phase detecting means having inputs connected to the demodulated signal and the phase reference signals in opposite phase whereby said detecting means produces outputs in proportion to the relative phases of the demodulated FM signal.

2. A tracker according to claim 1 in which the reflecting surfaces are a pair of front surface mirrors.

3. A tracker according to claim 1 in which the reflecting surfaces are the internal surfaces of a right angled totally reflecting prism.

References Cited by the Examiner

UNITED STATES PATENTS

| | | | |
|---|---|---|---|
| 2,490,052 | 12/1949 | Harris | 88—57 |
| 2,961,545 | 11/1960 | Astheimer et al. | 250—203 |
| 2,997,539 | 8/1961 | Blackstone | 88—1 |
| 3,061,730 | 10/1962 | Jankowitz | 250—203 |
| 3,091,690 | 5/1963 | McHenry | 250—218 X |
| 3,099,748 | 7/1963 | Weiss | 260—203 |

RALPH G. NILSON, *Primary Examiner.*

WALTER STOLWEIN, *Examiner.*